(12) United States Patent
Synal

(10) Patent No.: US 12,089,040 B2
(45) Date of Patent: Sep. 10, 2024

(54) CALLER VERIFICATION IN RICH COMMUNICATION SERVICES (RCS)

(71) Applicant: T-Mobile USA, Inc., Bellevue, WA (US)

(72) Inventor: Adrian T. Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/090,359

(22) Filed: Dec. 28, 2022

(65) Prior Publication Data

US 2023/0136421 A1 May 4, 2023

Related U.S. Application Data

(62) Division of application No. 17/115,483, filed on Dec. 8, 2020, now Pat. No. 11,546,760.

(60) Provisional application No. 63/015,325, filed on Apr. 24, 2020.

(51) Int. Cl.
*H04W 12/06* (2021.01)
*H04L 9/40* (2022.01)
*H04M 3/42* (2006.01)
*H04W 12/069* (2021.01)

(52) U.S. Cl.
CPC ......... *H04W 12/068* (2021.01); *H04L 63/166* (2013.01); *H04M 3/42042* (2013.01); *H04W 12/069* (2021.01)

(58) Field of Classification Search
CPC .. H04W 12/068; H04W 12/069; H04L 63/166
See application file for complete search history.

(56) References Cited

U.S. PATENT DOCUMENTS

| 10,764,043 B2 | 9/2020 | Traynor et al. |
| 2017/0078466 A1* | 3/2017 | Yaung ................. H04W 12/043 |
| 2017/0264443 A1* | 9/2017 | Tu .......................... H04L 9/3268 |
| 2019/0281157 A1* | 9/2019 | Gupta ..................... H04L 63/18 |
| 2021/0337384 A1 | 10/2021 | Synal |

* cited by examiner

*Primary Examiner* — Amal S Zenati
(74) *Attorney, Agent, or Firm* — Lee & Hayes, P.C.

(57) ABSTRACT

Techniques for caller verification in Rich Communication Services (RCS) for text messaging are discussed herein. A communication client can be the communication client designated to receive incoming communications for the user equipment. The user equipment may use the communication client to send, to a network device, a Session Initiation Protocol (SIP) instance to set communication client. The SIP instance may include a primary designator and a Universally Unique Identifier (UUID) associated with the client. The network device may store the information for the user equipment including the UUID and capability set. A second user equipment may poll the network device for the communications capabilities of the first user equipment before establishing a connection.

20 Claims, 8 Drawing Sheets

800 ↘

```
RECEIVE, FROM A COMPUTING DEVICE, A REQUEST TO INITIATE A
COMMUNICATION SESSION WITH SESSION INFORMATION INCLUDING
MESSAGE DATA, AN ORIGINATING NUMBER, AND A TERMINATING NUMBER
802
```
↓
```
DETERMINE THE SESSION INFORMATION INCLUDES A DIGITAL SIGNATURE
ASSOCIATED WITH THE ORIGINATING NUMBER
804
```
↓
```
REQUEST, FROM A CERTIFICATE REPOSITORY, A VERIFICATION STATUS
FOR THE DIGITAL SIGNATURE
806
```
↓
```
RECEIVE, FROM THE CERTIFICATE REPOSITORY, THE VERIFICATION
STATUS FOR THE DIGITAL SIGNATURE
808
```
↓
```
GENERATE, BASED AT LEAST IN PART ON THE VERIFICATION STATUS, A
STATUS NOTIFICATION
810
```
↓
```
TRANSMIT, TO A USER DEVICE ASSOCIATED WITH THE TERMINATING
NUMBER, THE SESSION INFORMATION AND THE STATUS NOTIFICATION
812
```

FIG. 8

CALLER VERIFICATION IN RICH COMMUNICATION SERVICES (RCS)

This application is a divisional of and claims priority to commonly assigned, co-pending U.S. patent application Ser. No. 17/115,483, filed Dec. 8, 2020, which claims priority to U.S. Patent Application No. 63/015,325, entitled "Caller Verification in RCS," filed Apr. 24, 2020. Application Ser. Nos. 17/115,483 and 63/015,325 are fully incorporated herein by reference in their entirety.

BACKGROUND

Modern telecommunication systems include heterogeneous mixtures of second, third, fourth, and fifth generation (2G, 3G, 4G, 5G) cellular wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies.

To take advantage of the multigenerational mix of wireless communication technologies, user devices configured for telecommunications are capable of communicating, not only via various types of networks but also via various types of communication clients developed for the different networks. For instance, these user devices may be configured to use Rich Communication Services (RCS) as the communication protocol for messaging, over the previous Short Message Service (SMS) messages. However, while RCS provides a richer text-message system by allowing messaging via application programming interface (API)'s called Messaging as a Platform (MaaP), these API's do not require Subscriber Identity Module (SIM) based authentication to occur. Hence opportunities for spoofing text messages will be greater.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates an example process for caller verification for a message originating from a computing device, as discussed herein.

DETAILED DESCRIPTION

Figure 1:
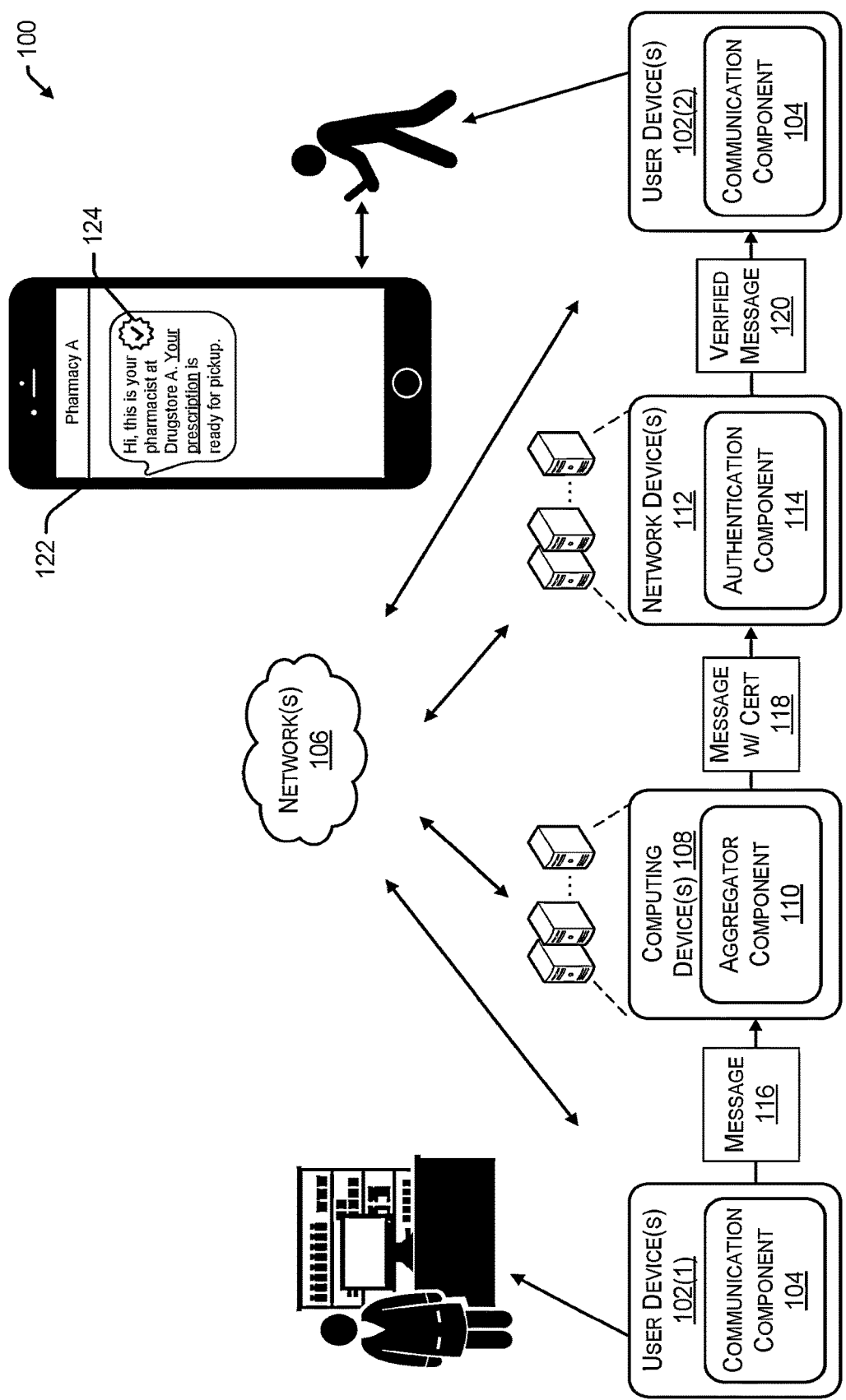
FIG. 1 illustrates an example system including user equipment and network device configured to implement caller verification components in Rich Communication Services (RCS).

Systems, devices, and methods are directed to user devices and network devices configured to implement caller verification components in Rich Communication Services (RCS) to verify the identity of a message originator. The present system may allow any originating device to send a verified message using an RCS enabled application programming interface (API). In some examples, the API may include Messaging as a Platform (MaaP). The system may indicate on the terminating client ("recipient") whether the message originator ("caller") was verified or unverified. A message indicated with a verified mark may show that the identification of the caller has been verified and the message likely originated from a legitimate source. On the other hand, a message indicated with an unverified mark may show that the identification of the caller has not been verified and the message may be spoofed by an illegitimate source. The terminating client may respond to the originator by including Instant Message Disposition Notification (IMDN) with response messages.

In some examples, the message originator may be associated with an entity, and message data sent from the message originator may be transmitted through an aggregator. The aggregator may include a message aggregating application and/or a communication client running on a computing device that is associated with an internal or external messaging service. The aggregator may receive message data generated by a human operator of an originating device and/or by a notification system on behalf of the entity. The aggregator may transmit the message data on behalf of the entity to one or more intended recipients. The one or more intended recipients may include individual recipients and/or subscriber groups. The message may appear on a terminating client associated with a recipient as if the message is originating from the entity. In some examples, the aggregator may store a Transport Layer Security (TLS) certificate associated with each entity that the aggregator serves. The TLS certificate may be issued by a certificate authority and may be used by the system to authenticate the entity as the message originator.

In various examples, the system may use public and private keys to sign calls. The system may create a pair of public and private keys for entity identifier and/or phone numbers. The private key may be placed in a secure key store (SKS) and the public key may be placed in a certificate repository. The carrier for the originator may send a request to the SKS to authenticate the originator and sign the outgoing message. In some examples, an originating client may use a device identifier associated with a local device to authenticate the originator. In an alternative and/or additional example, an aggregator may use a TLS certificate associated with an entity to authenticate the originator.

For instance, an agent working for the Internal Revenue Service (IRS) may send a tax refund message to a recipient taxpayer through an aggregator. The aggregator may transmit the message data including the tax refund message and the TLS certificate associated with the IRS. The system may authenticate the message originator using the TLS certificate before transmitting the message data to a carrier associated with the recipient taxpayer. The carrier for the recipient may send a verification request to the certificate repository to verify the identity of the message originator. The system may verify the signature owner by checking that the signature was created by the private key and may transmit the message data including the verification status.

In the present example, the system may transmit the message to a user device associated with the recipient taxpayer and may indicate the message was verified as sent from the IRS on a messaging API on the user device. In various examples, if the identity of the originator could not be verified, the terminating client may show the message indicated by an unverified mark and/or may hide or deactivate any embedded hyperlinks in the message. In additional examples, the terminating client may allow a user to manually change the verification status, including changing from unverified status to verified status and/or to unhide or activate any embedded hyperlinks.

In some examples, an originating client may poll a terminating client to discover the device capability of the terminating client. In various examples, the terminating client may include one or more functional capabilities that are different from the originating client, for example, the one or more functional capabilities may include, but is not limited to, multimedia message, instant message and chat, file transfer, image sharing, and the like. In some examples, the terminating client may only have the capability to receive Short Message Service (SMS) messages and not RCS messages. If the poll indicates that the terminating client lacks functional capabilities to receive RCS messages, then the system may refrain from performing the caller verification process.

In some instances, the systems, devices, and techniques described herein allow for an RCS system to verify the caller identity and notify a terminating client of the verification status of the message originator. The system allows both individual users associated with individual devices and multiple users associated with an entity to send authenticated messages to user devices. In examples, the system may indicate messages as originating from unverified callers and/or may hide or deactivate embedded hyperlinks in the message, this may decrease the chances of recipients falling for malicious spoofed messages that may attempt to defraud the recipients. This protects unsophisticated users from falling for spoofed messaging scams thus enhancing trust in communications related to text messaging. Additionally, the system allows the originator to poll for the capabilities of the terminating client before initiating the caller verification process. This optimizes network bandwidth use and improves communication logic because message data can incorporate the capability set of the terminating client to change the type of communication that the client is capable of and/or the data can be also be scaled down accordingly before transmission. Moreover, by allowing the originator to poll for the capabilities of the terminating client before transmitting data, the system may refrain from performing unnecessary caller verification process and may further refrain from attaching extraneous information data that is specific to the caller verification process before transmission which reduces processing power and network bandwidth usage. These and other improvements to the functioning of a computer and network are discussed herein.

The systems, devices, and techniques described herein can be implemented in a number of ways. Example implementations are provided below with reference to the following figures.

FIG. 1 illustrates an example system 100 including user devices and network device(s) configured to implement client managing components to identify the communication client.

The user device(s) 102(1) and user device(s) 102(2) (collectively referred to as user device(s) 102) can communicate with one or more computing device(s) 108 and/or one or more network device(s) 112 via one or more network(s) 106. The user device(s) 102 may allow users to create user accounts to subscribe to services provided by a service provider. The users may include individual persons, family groups, entities, and the like. In some examples, an entity may add any number of authorized user(s) to access and utilize the services for the entity. The authorized user(s) associated with the entity may operate user device(s) 102 and send or receive communications on behalf of the entity.

The user device(s) 102 may be associated with identification information including a device identifier and/or an account identifier. The device identifier may include one or more of a Mobile Station International Subscriber Directory Number (MSISDN), a subscriber identity module (SIM), an International Mobile Subscriber Identity (IMSI), an International Mobile Equipment Identity (IMEI). The account identifier may include one or more of user identification, an entity identification, and subscription information.

Examples of the user device(s) 102 can include but is not limited to, smartphones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user device(s) 102 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

The user device(s) 102 may include a communication component 104. In some examples, the communication component 104 may configure a communication client to support caller verification for text messaging via API. In some examples, the user device(s) 102 may initiate a text message communication using the communication client, which acts as an originating client, to transmit message data including identification information for caller verification. In additional examples, the user device(s) 102 may receive the text message communication using the communication client, which acts as a terminating client, to display the text message and may show the identification information including a verified or unverified mark next to the message.

The communication component 104 may configure a communication client to support caller verification for text messaging via API, as described herein. The communication component 104 may generate a user interface for the communication client to send, receive, and view the message content. The communication component 104 may determine where the communication client is acting as an originating client or a terminating client based on whether a communication session is originating from or is terminating at the user device(s) 102. The communication component 104 may receive input to designate an account to originate calls from. The communication component 104 may, based on the account and/or device, determine identification information to include for caller verification when originating a communication. In some examples, the user device(s) 102 may receive message data using the communication client, which acts as a terminating client, to display the text message and may show a verified mark or an unverified mark next to the message.

The communication component 104 may send a subscribe request to poll the capabilities of a communication client of a recipient account and/or device to the network device(s) 112, as described herein. In response to sending the subscribe request to the network device(s) 112, the communication component 104 may receive the capability set for the communication client of the requested recipient account and/or device. The communication component 104 may apply the capability set when communicating with the recipient device. Based on the capability set, the communication component 104 may change the types of communication and the scale the quality and resolution of media files and/or multimedia message used in the communication. If the capability set indicates the recipient client and/or device is not configured to use RCS or another communication protocol for messaging that is able to perform the caller verification process or display the verification status, the communication component 104 may determine to avoid performing any caller verification process and/or the system may avoid transferring any additional data (e.g., TLS certificate) specific to the caller verification process.

In various examples, the communication component 104 may receive message data from an entity user and may send the message data to an aggregator device (e.g., the computing device(s) 108). In some examples, the aggregator device may be associated with a message aggregator service and the entity may be a subscriber of the message aggregator service. In various examples, the communication component 104 may be integrated with a notification system for an entity, and the communication component 104 may receive input from the entity user to generate a message for a subscriber (e.g., client, user, customer) of the entity. The communication component 104 may receive the message data and send the message data to an aggregator (e.g., computing device(s) 108) to transmit the message on behalf of the entity.

The computing device(s) 108 can include an aggregator component 110. In some instances, the computing device(s) 108 can be implemented as one or more communication servers implementing the aggregator component 110 to facilitate communications by and between the various devices in the system 100. In various examples, the computing device(s) 108 may implement one or more components of the user device(s) 102. In some examples, the computing device(s) 108 is operated by a third-party aggregation service provider.

Examples of the computing device(s) 108 can include but is not limited to, smartphones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network.

The aggregator component 110 can receive and send messaging data on behalf of an entity. In some examples, the aggregator component 110 may maintain a database of data associated with any entity that the computing device(s) 108 serves. The data associated with an entity may include, but is not limited to, entity identifying information including TLS certificate, user accounts associated with the entity, subscribers of the entity and contact numbers for the subscribers, and the like. The aggregator component 110 may receive message data from a different user device(s) 102 and/or notification system associated with an entity and aggregate the messages to be sent out. The aggregator component 110 may determine the terminating device(s) to route the messages based on a recipient number or a subscriber group designated in the message. For instance, the aggregator component 110 may receive a weekly sale message and may determine to send the message to all subscribers of special offering notifications from the entity. In another instance, the aggregator component 110 may receive a prescription-filled notification message and may determine to send the message to the patient recipient only. In some examples, the aggregator component 110 may transmit the message data with a TLS certificate associated with the entity to provide caller verification.

The network device(s) 112 can include an authentication component 114. In some instances, the network device(s) 112 can be implemented as one or more communication servers to facilitate communications by and between the various devices in the system 100. That is, the network device(s) 112 can represent any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 112 may implement GSM, UMTS, LTE/LTE Advanced, and/or NR telecommunications technologies. In some instances, the telecommunication technologies can be referred to generally as a radio access technology. Thus, a 5G network can represent 5G radio access technology. The network device(s) 112 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user device(s) 102, the computing device(s) 108, the network device(s) 112, and/or the network(s) 106. In some embodiments, the network device(s) 112 are operated by a service provider.

The authentication component 114 can receive and store user data including designated communication client information from the user device(s) 102, as discussed herein. The authentication component 114 may maintain a user database with user accounts associated with the user device(s) 102. Initially, the authentication component 114 can receive a first publish request from a user device(s) 102 and can associate the user account with the International Mobile Equipment Identity (IMEI) identifier for the native client.

While FIG. 1 illustrates the network(s) 106, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like. Examples of the network(s) 106 can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the user device(s) 102 can communicate with any number of user equipment, user devices, servers, network devices, computing devices, and the like.

As a non-limiting example, the example system 100 can illustrate an instance of caller verification using RCS for messages sent from an example entity to an example user. For instance, the example entity, "Drugstore A," may employ a pharmacist who may use the user device(s) 102(1) to send a prescription notification message to the example user who is a customer registered to receive text notifications with the user device(s) 102(2).

In the present example, the pharmacist working for Drugstore A may wish to notify a customer that their prescription is ready for pickup. The pharmacist may enter a prescription notification through Drugstore A's notification system. In response to the pharmacist sending the prescription notification, the user device(s) 102(1) may generate an example message 116 with the prescription notification and transmit the example message 116 to an example aggregating service running one or more computing device(s) 108 configured with the aggregator component 110. The example aggregating service may receive the example message 116 and verify the identity of the originating entity. To verify the identity of Drugstore A, the example aggregator may store the Transport Layer Security (TLS) certificate associated with the entity Drugstore A. The example aggregator may transmit the example message with certificate 118 for caller verification. The certificate may be transmitted to a certificate authority (e.g., SHAKEN solution's secure key store (SKS).

The example aggregator may determine to send the message to the user device(s) 102(2) and may send a communication request to the service provider for the user device(s) 102(2). For instance, the computing device(s) 108 may transmit a communication request with the example message with certificate 118 to the network device(s) 112. The network device(s) 112 may verify the identity of the message originator and transmit the example verified message 120 to the user device(s) 102(2). The customer may receive the example rich message 122 and the communication client may display the example verification mark 124 to indicate that Drugstore A is the verified caller.

Figure 2:
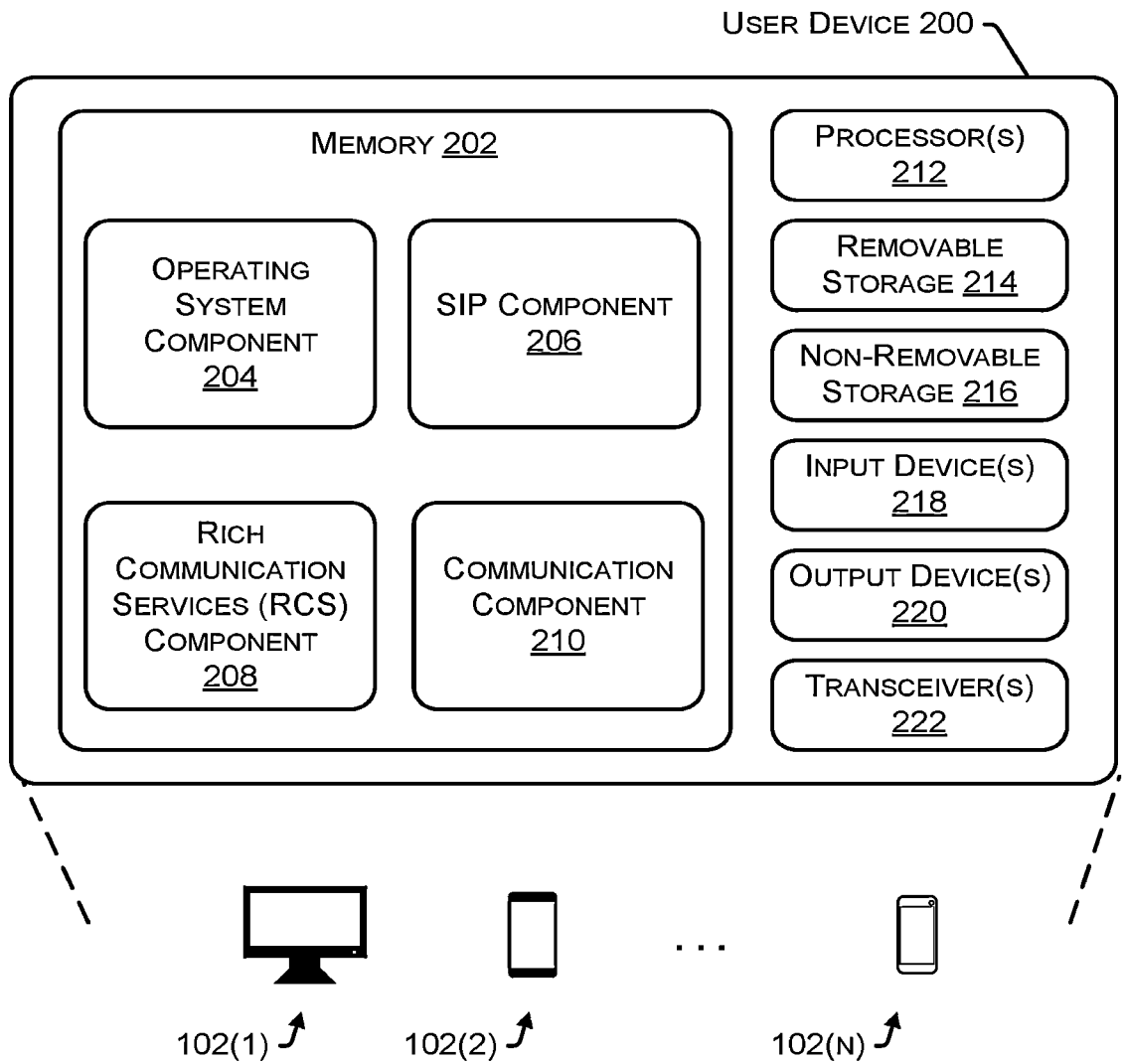
FIG. 2 illustrates an example user device configured to implement the caller verification components, in accordance with some examples of the present disclosure.

FIG. 2 illustrates an example user device 200 configured to implement the client managing components, in accordance with embodiments of the disclosure. In some embodiments, the user device 200 can correspond to the user device(s) 102 of FIG. 1. It is to be understood in the context of this disclosure that the user device 200 can be implemented as a single device or as a plurality of devices with components and data distributed among them. By way of example, and without limitation, the user device 200 can be implemented as various user device(s) 200(1), 200(2), . . . , 200(N).

As illustrated, the user device 200 comprises a memory 202 storing an operating system component 204, a Session Initiation Protocol (SIP) component 206, an RCS component 208, and a communication component 210. Also, the user device 200 includes processor(s) 212, a removable storage 214 and non-removable storage 216, input device(s) 218, output device(s) 220, and transceiver(s) 222.

In various embodiments, the memory 202 is volatile (such as RAM), non-volatile (such as ROM, flash memory, etc.) or some combination of the two. The operating system component 204, the SIP component 206, the RCS component 208, and the communication component 210 stored in the memory 202 can comprise methods, threads, processes, applications, or any other sort of executable instructions. The operating system component 204, the SIP component 206, the RCS component 208, and the communication component 210 can also include files and databases.

The operating system component 204 can include functionality to identify and track the different applications installed on the user device 200. The operating system component 204 can include functionality to query a chipset of the user device 200, and/or query the transceiver(s) 222, to instruct the transceiver(s) 222 and/or any software or hardware to scan one or more channels or frequency resources to determine metrics associated with the channel or frequency resources, for example. In some instances, the operating system component 204 can include an API to receive instructions from one or more of the SIP component 206, the RCS component 208, and the communication component 210 and to provide data to the corresponding components, including identifying the communication clients and/or communication capabilities of the user device 200 and/or a serving network, and notifying the components of clients and/or capabilities. The serving network may include one or more network(s) that the user device 200 is currently communicatively connected to. For instance, a user device 200 may be connected to a 5G cellular network and/or connected to a home Wi-Fi network.

The SIP component 206 may enable communications to be served using SIP instances and/or SIP messages. The SIP component 206 may transmit SIP messages containing information for identifying the user account, user equipment, and/or the communication client to serve a communication session including but not limited to: SIP instance information, access network information, Mobile Station International Subscriber Directory Number (MSISDN), International Mobile Subscriber Identity (IMSI), International Mobile Equipment Identity (IMEI) of the device, Universally Unique Identifier (UUID), called-party-address as Circuit-Switched Routing Number (CSRN), and session description protocol (SDP). The SIP component 206 may use SIP signaling and determine the current location of the user device 200 using a Global Positioning System (GPS). In some examples, a phone mode may be determined based at least in part on a location (e.g., the current location) associated with user equipment. For example, if the current location of the user device 200 is within a geographic area in which a service provider, associated with an identifier of the user device 200, provides coverage, then the phone mode may be set to carrier mode. If the current location of the user device 200 is in a geographic area in which the service provider does not provide coverage, then the phone mode may be set to Over-The-Top (OTT) mode. In some examples, the SIP component 206 may determine, based on the phone mode not set to carrier mode, that certain carrier-specific functions may be unavailable including, but not limited to, selecting certain types of communications or client designations. For instance, the SIP component 206 may determine the user device 200 is currently not in carrier mode and may not be able to use certain features of RCS messaging and instead default to SMS messaging.

In various examples, the SIP component 206 may transmit SIP messages with headers and/or strings to trigger specific functions and/or commands. As described herein, the SIP information may include information identifying an originating party and a terminating party. In some examples, the originating party and/or the terminating party may be an entity identifier rather than a device identifier. Additionally, the SIP information may include one or more commands: PUBLISH, SUBSCRIBE, NOTIFY, and the like.

The RCS component 208 may determine the capability of the user device 200 and the serving network to determine the enabled feature information for a communication client. As described herein, the serving network may include one or more network(s) that the user device 200 is currently communicatively connected to. The RCS component 208 may send, to the network, a publish request to set the enabled feature information of the communication client. While the RCS component 208 may send the enabled feature information to the network, it is understood in the context of this document, that the user device 200 may send and/or receive the enabled feature information via the SIP component 206, RCS component 208, the communication component 210, and/or another component. Additionally, and/or alternatively, the user device 200 may send the enabled feature information to the network in response to an interrogation rather than as a publish request.

The RCS component 208 may send a subscribe request to poll the communications capabilities of a recipient account to the network. In response to the subscribe request, the RCS component 208 may receive a "NOTIFY" response including a capability set for the recipient account from the network. The RCS component 208 may apply the capability set when communicating with the recipient account. Based on the capability set, the RCS component 208 may enable or disable features of the communication client including changing a communication type and/or scale the quality and resolution of multimedia files used in the communication. For instance, the originating device may use 5G stand-alone features, however, if the RCS component 208 determines the recipient device is using 4G features, the RCS component 208 may disable some of the 5G specific features in the communication client.

In various examples, the RCS component 208 may perform caller identity verification for RCS messaging. For an outgoing message, the RCS component 208 may transmit the outgoing message to a server of an originating carrier for authentication (e.g. full attestation) of the caller identity of the message originator. For an incoming message, the RCS component 208 may receive the incoming message with a verification status from a server of a terminating carrier. In some examples, the RCS component 208 may initiate a communication session for messaging between an originating client and a terminating client, and if the communication session is maintained, the verification status may be maintained until the communication session is terminated. In various examples, the RCS component 208 for the originating client may include an Instant Message Disposition Notification (IMDN) in the message header, and the terminating client may respond to the originator by including IMDN with response messages. The communication session may be terminated based on one or more of: predetermined time out (e.g., 2 seconds after the last message transmitted, 30 minutes after initiate time, etc.), selection of session end by a user, and/or signal loss from a device.

In some examples, the RCS component 208 may leverage Secure Telephone Identity Revisited (STIR) and Signature-based Handling of Asserted Information Using toKENs (SHAKEN) standards for caller ID authentication for phone calls as the framework of caller ID authentication for RCS messaging. For instance, in an example phone call originating with an entity and terminating at a consumer, the STIR/SHAKEN standards provide caller ID authentication by allowing the phone call to travel through interconnected phone networks to have the caller ID of the entity: (1) "signed" as legitimate by the originating carrier; and (2) validated by terminating carrier before reaching the consumer. Thus, in the present example, the STIR/SHAKEN protocol may digitally validate a handoff of a voice call passing through an entity network to allow the phone company of the consumer receiving the call to verify that the voice call is in fact from the number displayed on caller ID.

In some examples, the RCS component 208 may use the STIR/SHAKEN protocol to authenticate a message. In an example RCS message originating from an entity device and terminating at a consumer device, the STIR/SHAKEN protocol may provide caller ID authentication by allowing the RCS message routed through an aggregator to have the caller ID of the entity: (1) "signed" as legitimate by the originating carrier; and (2) validated by terminating carrier before reaching the consumer. In some examples, the RCS component 208 may send an authentication request (e.g., full attestation) to an RCS server associated with the originating carrier. The originating carrier may sign the message (e.g., add certification information to a SIP message header) to authenticate (e.g., attest) that the caller ID has not been spoofed, the originating carrier is responsible for the origination of the message onto the network, and the originating carrier has a direct authenticated relationship with the entity sending the SIP message and can identify the entity.

In various examples, the RCS component 208 may receive and verify the caller identity of a message for the user device 200. As described herein, the RCS component 208 may receive the message with the verification status of the originator. The RCS component 208 may determine the caller identity and verification status and call the communication component 210 to display the message and verification status.

The communication component 210 may include functionality to send and receive communications (e.g., voice calls, texts, instant messages, etc.) and/or determine when to transition an existing communication from one access network to another. In some examples, the communication component 210 may perform a number of functions, such as interfacing with the transceiver(s) 222, preparing the user device 200 to receive communications, tuning the transceiver(s) 222, receiving and processing an invitation message such as a SIP instance received via the transceiver(s) 222, and the like.

The communication component 210 may include a communication client to send and receive communications. In some examples, the communication component 210 may configure the communication client to support caller verification for messages via API (e.g., MaaP), as described herein. The communication client may generate a user interface to send, receive, and view the message content. The communication client may be configured to send and receive communication for one or more subscriber accounts (e.g., personal cellphone, work cellphone, etc.). The communication client may be configured to use a particular account of the one or more subscriber accounts to originate a communication with. The communication component 210 may determine identification information of the particular account to include for caller verification. In some examples, the user device 200 may receive message data using the communication client, which acts as a terminating client, to display the text message and may show a verified or unverified mark next to the message.

In some examples, the communication component 210 may determine to hide any portion of a message from an unverified caller. In an example, the communication client may display the entire message from the unverified caller with the unverified mark and disable any hyperlinks. In an additional and/or alternative example, the communication client may render the message from the unverified caller with a portion of the message hidden (e.g., hiding hyperlink text). In various examples, the communication component 210 may determine to quarantine the message from the unverified caller and place it in a quarantine folder, which a user may view and mark as correctly or incorrectly quarantined. In some examples, the communication component 210 may include functionality to allow automatically opting in or out of transmitting the message from the unverified caller to a network server to help identify malicious spam. For instance, the communication component 210 may send an unverified message to the network server and the network server may analyze the message for links or content for malicious content. If malicious content is found, the network server may determine to quarantine similar messages transmitted through the network.

The communication component 210 may trigger a poll for the capabilities of a recipient client, as described herein. The communication component 210 may call the RCS component 208 to transmit a subscribe request to poll the capabilities of the communication client of a recipient account and/or device. In response to the poll, the communication component 210 may receive the capability set for the recipient client. The communication component 210 may apply the capability set when communicating with the recipient client. Based on the capability set, the communication component 210 may change a communication type and scale the quality and resolution of media files and/or multimedia message used in the communication. If the capability set indicates the recipient client is not configured to use RCS and/or compatible messaging protocol that is able to perform the caller verification process, the communication component 210 may determine to avoid performing any caller verification process and/or the system may avoid transferring any additional data (e.g., TLS certificate) specific to the caller verification process.

In various examples, the communication component 210 may perform additional functionality based on the device the communication component 210 is installed. In a first instance, if the communication component 210 is installed on an entity device, the communication component 210 may receive message data from an entity account and may send the message data to an aggregator device (e.g., a computing device(s) 108). In the present example, the communication component 210 may be integrated with a notification system for an entity and the communication component 210 may receive input from the entity account to generate a message for a designated recipient and/or subscriber(s) (e.g., client, user, customer) of the entity. The communication component 210 may receive the message data and send the message data to the aggregator device to transmit the message on behalf of the entity. In another instance, if the communication component 210 is installed on the aggregator device, the communication component 210 may send and/or receive message data between the entity account and the designated recipient and/or subscriber(s). The communication component 210 may receive the message data from the entity account and transmit the message on behalf of the entity.

Additionally, the communication component 210 may receive the message data from a user device and transmit the message to the entity account.

In some embodiments, the processor(s) 212 is a central processing unit (CPU), a graphics processing unit (GPU), or both CPU and GPU, or other processing unit or component known in the art.

The user device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer-readable instructions, data structures, program modules, or other data. Memory 202, removable storage 214 and non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user device 200. Any such tangible computer-readable media can be part of the user device 200.

In various embodiments, the user device 200 can include applications including but are not limited, a web browser application, a video streaming application, an online gaming application, a network analyzer, and the like. During execution on the user device 200, each of the applications may be configured to cause the user device 200 to initiate data communications with the network device(s) 112 over the network(s) 106.

The user device 200 may be configured to communicate over a telecommunications network using any common wireless and/or wired network access technology. Moreover, the user device 200 may be configured to run any compatible device operating system (OS), including but not limited to, Microsoft Windows Mobile, Google Android, Apple iOS, Linux Mobile, as well as any other common mobile device OS.

The user device 200 also can include input device(s) 218, such as a keypad, a cursor control, a touch-sensitive display, voice input device, etc., and output device(s) 220 such as a display, speakers, printers, etc. These devices are well known in the art and need not be discussed at length here.

As illustrated in FIG. 2, the user device 200 also includes one or more wired or wireless transceiver(s) 222. For example, the transceiver(s) 222 can include a network interface card (NIC), a network adapter, a LAN adapter, or a physical, virtual, or logical address to connect to various network(s) 106, or to the network device(s) 112, for example. To increase throughput when exchanging wireless data, the transceiver(s) 222 can utilize multiple-input/multiple-output (MIMO) technology. The transceiver(s) 222 can comprise any sort of wireless transceivers capable of engaging in wireless, radio frequency (RF) communication. The transceiver(s) 222 can also include other wireless modems, such as a modem for engaging in Wi-Fi, WiMax, Bluetooth, infrared communication, and the like.

In some instances, the transceiver(s) 222 can correspond to the transceiver(s) 106 of FIG. 1.

Figure 3:
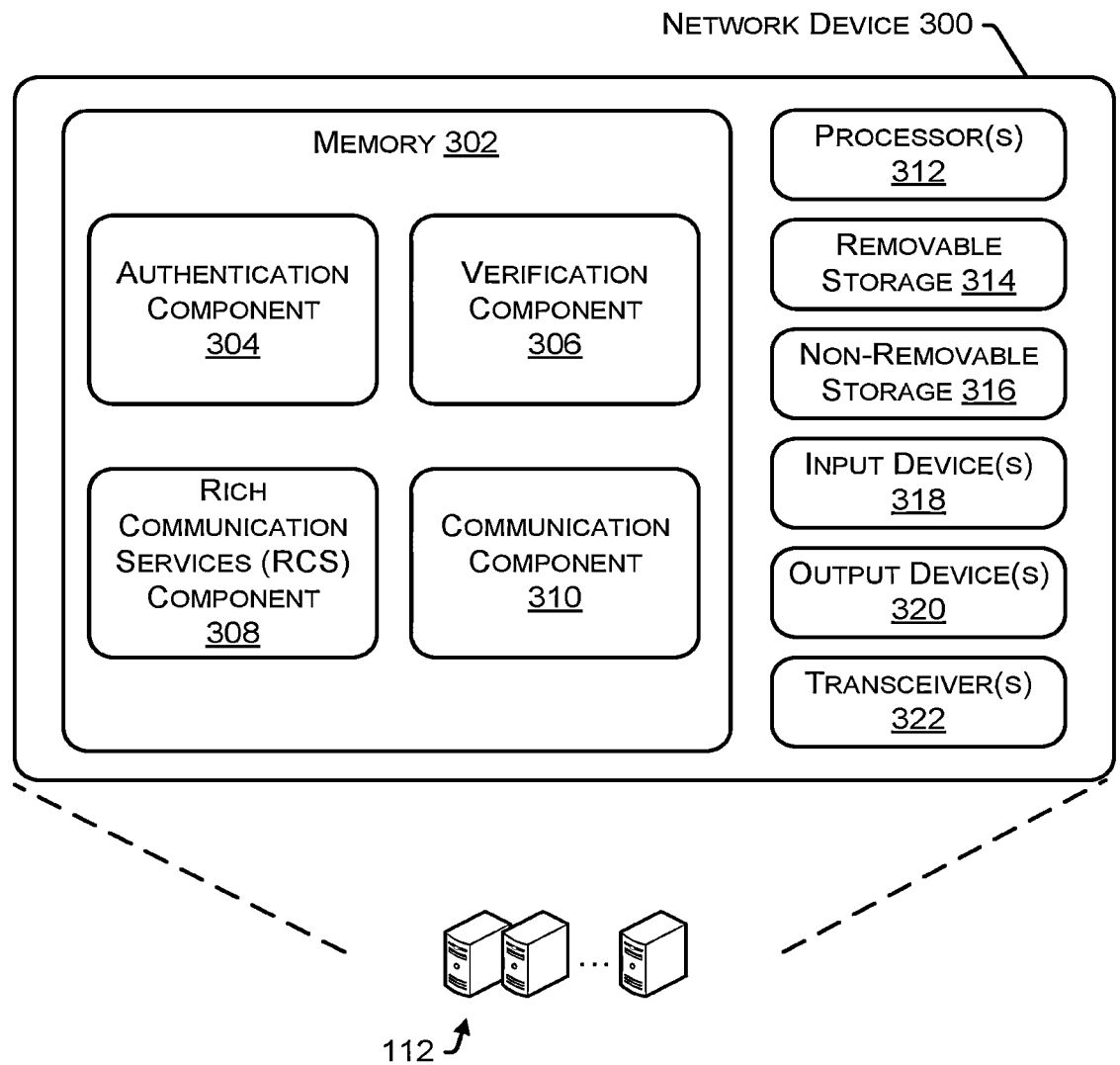
FIG. 3 illustrates an example network device configured to implement the caller verification components, in accordance with some examples of the present disclosure.

FIG. 3 illustrates an example network device 300 configured to implement the client managing components, in accordance with embodiments of the disclosure. In some embodiments, the network device 300 can correspond to the network device(s) 112 of FIG. 1. It is to be understood in the context of this disclosure that the network device 300 can be implemented as a single device or as a plurality of devices with components and data distributed among them.

As illustrated, the network device 300 comprises a memory 302 storing an authentication component 304, a verification component 306, an RCS component 308, and a communication component 310. Also, the network device 300 includes processor(s) 312, a removable storage 314 and non-removable storage 316, input device(s) 318, output device(s) 320, and transceiver(s) 322.

In various embodiments, the memory 302 is volatile (such as RAM), non-volatile (such as ROM, flash memory, etc.) or some combination of the two. The authentication component 304, the verification component 306, the RCS component 308, and the communication component 310 stored in the memory 302 can comprise methods, threads, processes, applications, or any other sort of executable instructions. The authentication component 304, the verification component 306, the RCS component 308, and the communication component 310 can also include files and databases.

The authentication component 304 can include functionality to authenticate user accounts, devices, and/or any other communications components to interact with the network. A user account may be associated with one or more individual user(s) and/or an entity. In some examples, the authentication component 304 may present a user portal for a user to create the user account and/or register a user device with the network. The authentication component 304 may receive requests to initiate the user device. The authentication component 304 may verify that the user device is permitted to connect to the network and prompt the user for account information. The authentication component 304 may retrieve data from the verification component 306 and/or any other database to verify the user account and/or user device is authorized to use the services provided by the network device 300.

In some examples, the authentication component 304 can include functionality to generate public and private keys and/or digital certificates. The authentication component 304 may use the public and private keys and/or digital certificates to sign certificates. In some examples, authentication component 304 may invoke the Authentication and Signing Services to generate keys and sign certificates. The authentication component 304 may be included with a SIP application server providing STIR/SHAKEN services. The authentication component 304 may include a SHAKEN architecture which may include a STI-AS and a STI-VS for the network.

In various examples, the authentication component 304 may determine whether a potential caller is authorized to poll the capabilities of a recipient client. For instance, the recipient account data may include a "block list," the authentication component 304 may verify a message originated by an entity is authorized to contact the recipient before polling the recipient client and/or before transmitting the message to the recipient client. Additionally, and/or alternatively, the authentication component 304 may verify the identity of the potential caller before or after polling the recipient client.

In some instances, the authentication component 304 can correspond to the authentication component 114 of FIG. 1.

The verification component 306 can collect data associated with caller verification in a database. As described herein, the authentication component 304 may present a portal to create accounts, register devices with the network, and may generate keys for identity verification. The verification component 306 may collect and store information specific to the account, including one or more of: authorized user(s), username(s), account identifier, entity identifier, key(s), subscription, and the like. The verification component 306 can also collect information specific to one or more user device(s) associated with the account, including a device type, a device identifier, communications capabilities, and the like. The verification component 306 may receive information from the user device including one or more of: Subscriber Identity Module (SIM), Mobile Station International Subscriber Directory Number (MSISDN), an International Mobile Subscriber Identity (IMSI), International Mobile Equipment Identity (IMEI), and the like.

In some examples, the verification component 306 may use public and private keys to verify RCS messages. The verification component 306 may place the private key in a secure key store (SKS) and place the public key in a certificate repository. In some examples, the verification component 306 may manage the keys and certificates through a certificate management service (CMS). The CMS can be software run by the service provider or a hosted solution.

The RCS component 308 can receive message data from a message originator and perform caller verification for the message originator. The RCS component 308 can receive RCS messages as a communication session with session information including one or more of message data, an originating number, a Transport Layer Security (TLS) certificate, digital signature, IMDN, a terminating number, and the like. The message originator may include an entity sending an RCS message through an aggregator ("Aggregator") or a person sending an RCS message through a user device ("Person"). The RCS component 308 may call the verification component 306 to verify the identity of the originator.

In an example Aggregator to Person (A2P) caller verification, the RCS component 308 may service outgoing message originating from an entity. The RCS component 308 may receive the outgoing message via an RCS application from an aggregator and the outgoing message may include a Transport Layer Security (TLS) certificate associated with the entity. The RCS component 308 may send the message to the SKS to request authentication using the TLS certificate and to sign the outgoing message.

In an example Person to Aggregator (P2A) or Person to Person (P2P) caller verification, the RCS component 308 may service an outgoing message originating from a user. The RCS component 308 may receive the outgoing message via an originating client from a user device and the outgoing message may include a device identifier (e.g., SIM). The RCS component 308 may send the message to the SKS to request authentication using the device identifier and to sign the outgoing message.

In some examples, the RCS component 308 may receive an incoming message and perform caller identity verification for the originator. The RCS component 308 may receive the incoming message from a server serving the originator. The RCS component 308 may send the incoming message to a certificate repository to request verification using the signed incoming message. In some examples, the RCS component 308 may initiate the communication session based on performing the perform caller identity verification and receiving the session information. The RCS component 308 may transmit the session information and the TLS certificate including the signature.

The RCS component 308 may initiate the communication session for messaging between an originating client and a terminating client, and if the communication session is maintained, the verification status may be maintained until the communication session is terminated. In various examples, the RCS message from an originating client may include an Instant Message Disposition Notification (IMDN) in the message header, and the terminating client may respond to the originator by including IMDN with response messages. The communication session may be terminated based on one or more of: predetermined time-lapse and/or predetermined time out and/or expiration of a period of time (e.g., 2 seconds after the last message transmitted, 30 minutes after initiate time, etc.), selection of session end by a user, and/or signal loss from a device.

The RCS component 308 can receive a subscribe request for a recipient device from an originating device, as discussed herein. The subscribe request may include information to identify the originator and/or the recipient including one or more of: account identifier, username, Mobile Station International Subscriber Directory Number (MSISDN), an International Mobile Subscriber Identity (IMSI), and the like. The RCS component 308 may receive a subscribe request for the recipient and may poll the communication capabilities associated with the recipient client. In response to receiving the communication capabilities, the RCS component 308 may send a notify response with the communication capabilities to the originator.

The communication component 310 can include functionality to determine a particular communication capability to use when communicating with a recipient device. For example, the RCS component 308 can determine the recipient device is using a communication client that is not compatible with RCS protocols, and the communication component 310 may refrain from performing the RCS message process.

In some examples, the communication component 310 may include functionality to receive and analyze messages from user devices. In examples, the communication component 310 may generate notifications for caller identity verification based on the verification status. If a message is an unverified message including messages marked as originating from an unverified caller, the communication component 310 may analyze the message content to help identify malicious spam. For instance, the communication component 310 may receive the unverified message from a user device 200 and the communication component 310 may analyze the message data for links or content for malicious content. In some examples, the message data may be used as training data for a model to identify potential malicious content. If malicious content is found, the communication component 310 may determine to flag similar messages for quarantine as they flow through the network. In various examples, the communication component 310 may include functionality to receive user input to affirm or deny the flag for messages to be quarantined. For instance, if an unverified message was flagged for quarantine, but a user reviewed the message and marked it as a false positive, the communication component 310 may receive the user input and corrected data marked with false-positive and use the corrected data as new training data for a new model.

In some embodiments, the processor(s) 312 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and nonvolatile, removable and non-removable media implemented in any method or technology for storage of information, such as computer-readable instructions, data structures, program modules, or other data. Memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the network device 300. Any such tangible computer-readable media can be part of the network device 300.

The network device 300 can include input device(s) 318, such as a keypad, a cursor control, a touch-sensitive display, etc. Also, the network device 300 can include output device(s) 320, such as a display, speakers, etc. These devices are well known in the art and need not be discussed at length here.

As illustrated in FIG. 3, the network device 300 can include one or more wired or wireless transceiver(s) 322. In some wireless embodiments, to increase throughput, the transceiver(s) 322 can utilize multiple-input/multiple-output (MIMO) technology. The transceiver(s) 322 can be any sort of wireless transceivers capable of engaging in wireless, radio frequency (RF) communication. The transceiver(s) 322 can also include other wireless modems, such as a modem for engaging in Wi-Fi, WiMax, Bluetooth, infrared communication, or the like.

Figure 4:
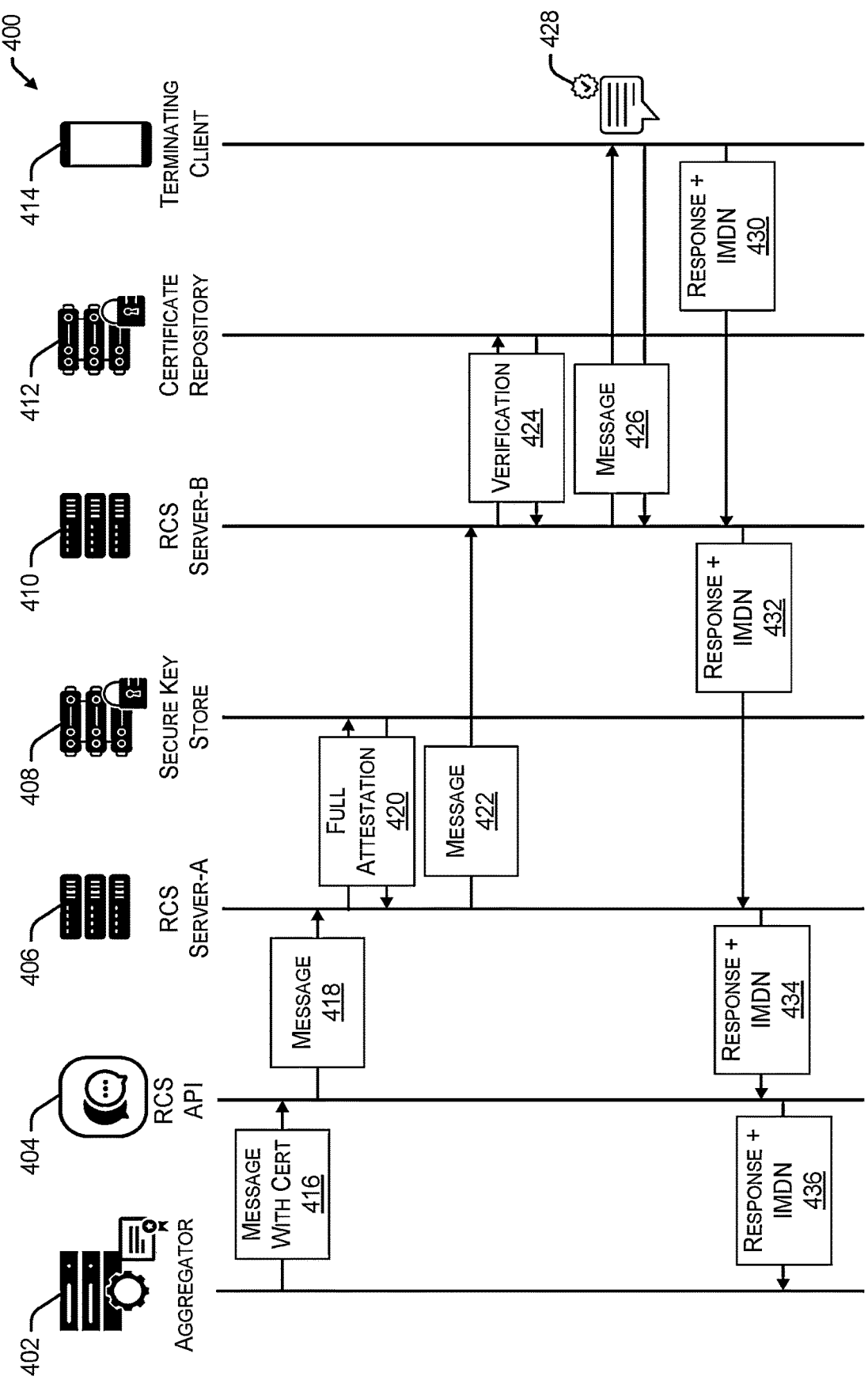
FIG. 4 is an example signal flow for the system of FIG. 1 in an aggregator to person (A2P) caller verification operation, in accordance with some examples of the present disclosure.

FIG. 4 is an example signal flow for the system of FIG. 1 in an aggregator to person (A2P) caller verification operation, in accordance with some examples of the present disclosure. As noted above, in some examples, an A2P caller verification operation may be commenced by a component of the computing device(s) 108, such as an aggregator 402; served by a component of the network device(s) 300, such as the authentication component 304, the verification component 306, the RCS component 308; and terminated at a component of the user device(s) 200, such as the RCS component 208 and the communication component 210. In the example illustrated in FIG. 4, the originating signal of the A2P caller verification comes from the aggregator 402, and may be transmitted by an RCS API 404, to an RCS Server-A 406 serving the originating client and signed by a secure key store 408. From the RCS Server-A 406, the signal is transmitted to the terminating client RCS Server-B 410, then verified by the certificate repository 412, and then transmitted to the terminating client 414.

In FIG. 4, at 416, the RCS API 404 includes a Transport Layer Security (TLS) certificate with the message. In some examples, the message may include an Instant Message Disposition Notification (IMDN) in the header. At 418, the RCS API 404 may transmit the message to the RCS Server-A 406 to initiate communication. As described herein, the RCS component 308 may receive the outgoing message via an RCS application (e.g., RCS API 404) from the aggregator 402 and the outgoing message may include a TLS certificate associated with the entity.

At 420, the RCS Server-A 406 may send the message to the SKS 408 to request authentication (e.g., full attestation) for the TLS certificate and to sign the outgoing message.

At 422, the RCS Server-A 406 may transmit the signed message to the RCS Server-B 410.

At 424, the RCS Server-B 410 may send the message to the certificate repository 412 to request verification for the signed TLS certificate and to determine the verification status for the message.

At 426, the RCS Server-B 410 may send the message and the verification status to the terminating client 414.

At 428, the terminating client 414 may present the message with a verified or unverified mark based on the verification status.

At 430, the terminating client may respond to the message by including IMDN with response messages. At 432, 434, and 436, the response with the IMDN included in the header is sent back to the commencing device, the aggregator 402.

Figure 5:
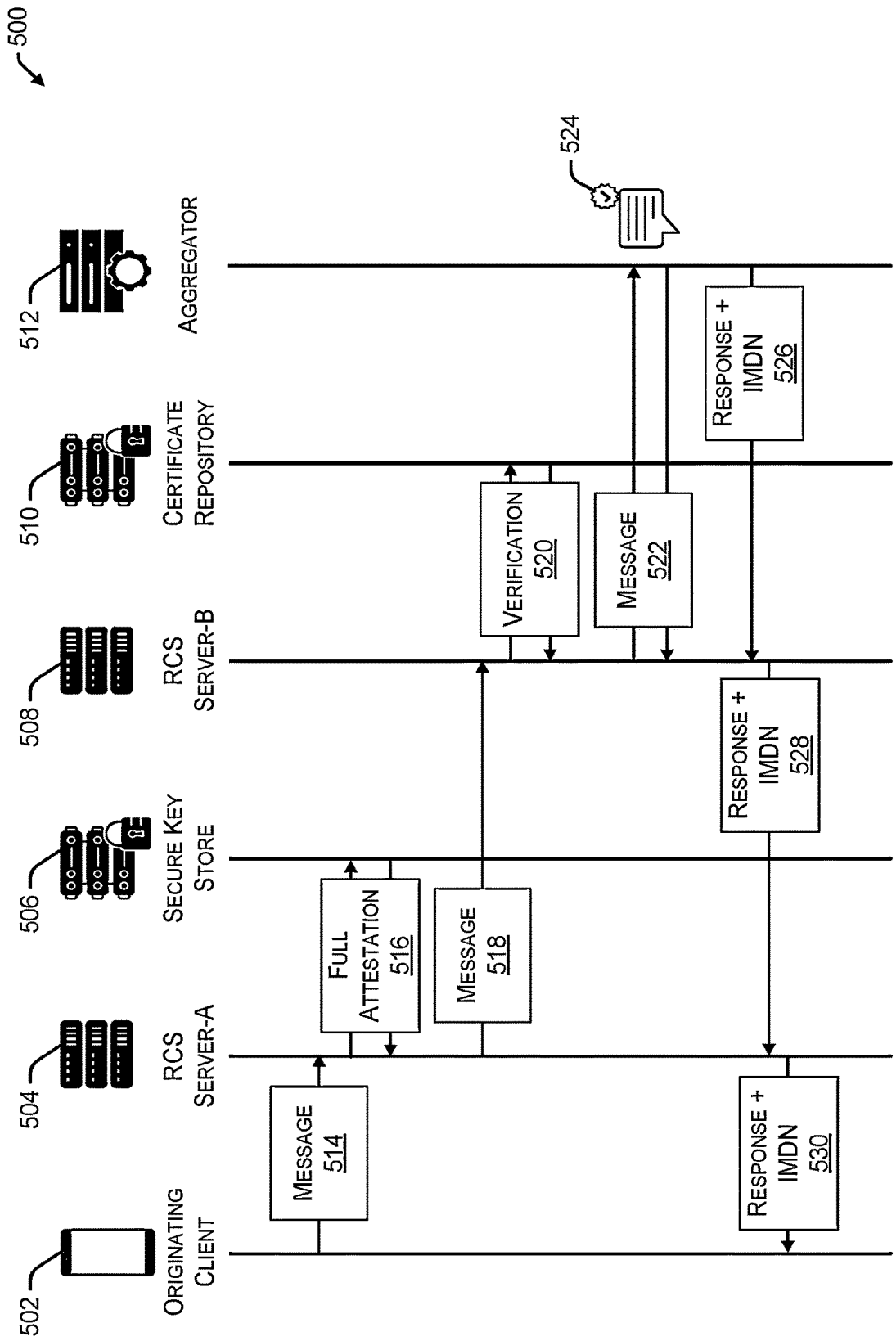
FIG. 5 is an example signal flow for the system of FIG. 1 in a person to aggregator (P2A) caller verification operation, in accordance with some examples of the present disclosure.

FIG. 5 is an example signal flow for the system of FIG. 1 in a person to aggregator (P2A) caller verification operation, in accordance with some examples of the present disclosure. As noted above, in some examples, the P2A caller verification operation may be commenced by a component of the user device(s) 200, such as an RCS component 208 and the communication component 210; served by a component of the network device(s) 300, such as the authentication component 304, the verification component 306, the RCS component 308; and terminated at a component of the computing device(s) 108, such as an aggregator 512. In the example illustrated in FIG. 5, the originating signal of the P2A caller verification comes from the originating client 502 and may be an RCS Server-A 504 serving the originating client and signed by a secure key store 506. From the RCS Server-A 504, the signal is transmitted to the terminating client RCS Server-B 508, then verified by the certificate repository 510, and then transmitted to the aggregator 512.

In FIG. 5, at 514, the RCS Server-A 504 may receive a message from the originating client 502. In some examples, the message may include an Instant Message Disposition Notification (IMDN) in the header. At 516, the RCS Server-A 504 may send the message to the SKS 506 to request authentication (e.g., full attestation) for the message and to sign the outgoing message. As described herein, in an example P2A or P2P caller verification, the RCS component 308 may service an outgoing message originating from the user device(s) 200. The RCS component 308 may receive the outgoing message via an originating client from a user device and the outgoing message may include a device identifier (e.g., SIM). The RCS component 308 may send the message to the SKS to request authentication using the device identifier and to sign the outgoing message.

At 518, the RCS Server-A 504 may transmit the signed message to the RCS Server-B 508.

At 520, the RCS Server-B 508 may send the message to the certificate repository 510 to request verification for the signed message and to determine the verification status for the message.

At 522, the RCS Server-B 508 may send the message and the verification status to the aggregator 512.

At 524, the aggregator 512 may receive the message on behalf of an entity and may present the message with a verified or unverified mark based on the verification status.

At 526, the aggregator 512 may respond to the message by including IMDN with response messages. At 528 and 530, the response with the IMDN included in the header is sent back to the commencing device, the originating client 502.

Figure 6:
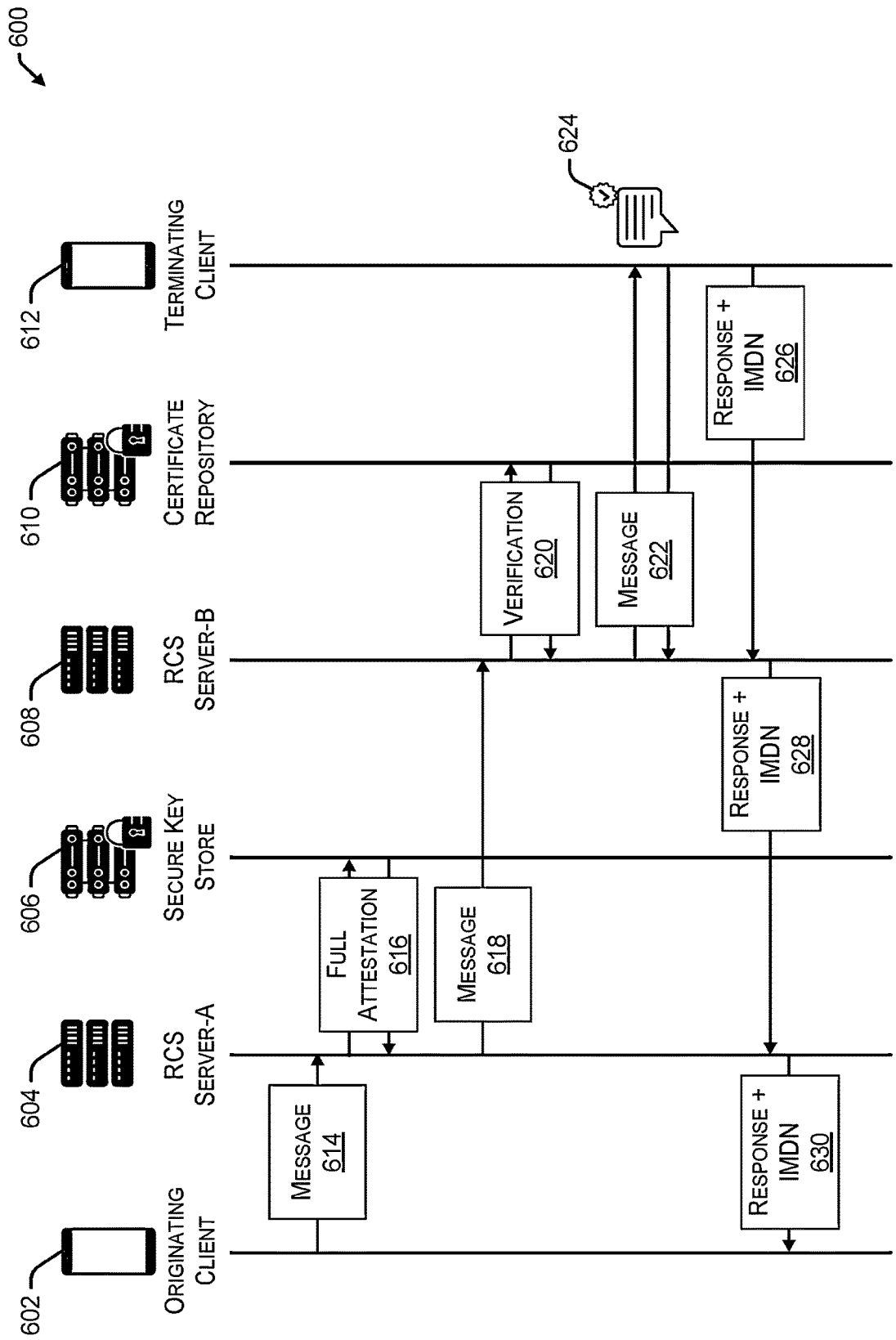
FIG. 6 is an example signal flow for the system of FIG. 1 in a person to person (P2P) caller verification operation, in accordance with some examples of the present disclosure.

FIG. 6 is an example signal flow for the system of FIG. 1 in a person to person (P2P) caller verification operation, in accordance with some examples of the present disclosure.

As noted above, in some examples, the P2P caller verification operation may be commenced by a component of the user device(s) 200, such as an RCS component 208 and the communication component 210; served by a component of the network device(s) 300, such as the authentication component 304, the verification component 306, the RCS component 308; and terminated at a component of the user device(s) 200, such as an RCS component 208 and the communication component 210.

In the example illustrated in FIG. 6, the originating signal of the P2P caller verification comes from the originating client 602 and may be an RCS Server-A 504 serving the originating client and signed by a secure key store 606. From the RCS Server-A 604, the signal is transmitted to the terminating client RCS Server-B 608, then verified by the certificate repository 610, and then transmitted to the terminating client 612.

In FIG. 6, at 614, the RCS Server-A 604 may receive a message from the originating client 602. In some examples, the message may include an Instant Message Disposition Notification (IMDN) in the header. At 616, the RCS Server-A 604 may send the message to the SKS 606 to request authentication (e.g., full attestation) for the message and to sign the outgoing message.

At 618, the RCS Server-A 604 may transmit the signed message to the RCS Server-B 608.

At 620, the RCS Server-B 608 may send the message to the certificate repository 610 to request verification for the signed message and to determine the verification status for the message.

At 622, the RCS Server-B 608 may send the message and the verification status to the aggregator 612.

At 624, the terminating client 612 may receive the message on behalf of a user and may present the message with a verified or unverified mark based on the verification status.

At 626, the aggregator 612 may respond to the message by including IMDN with response messages. At 628 and 630, the response with the IMDN included in the header is sent back to the commencing device, the originating client 602.

Figure 7:
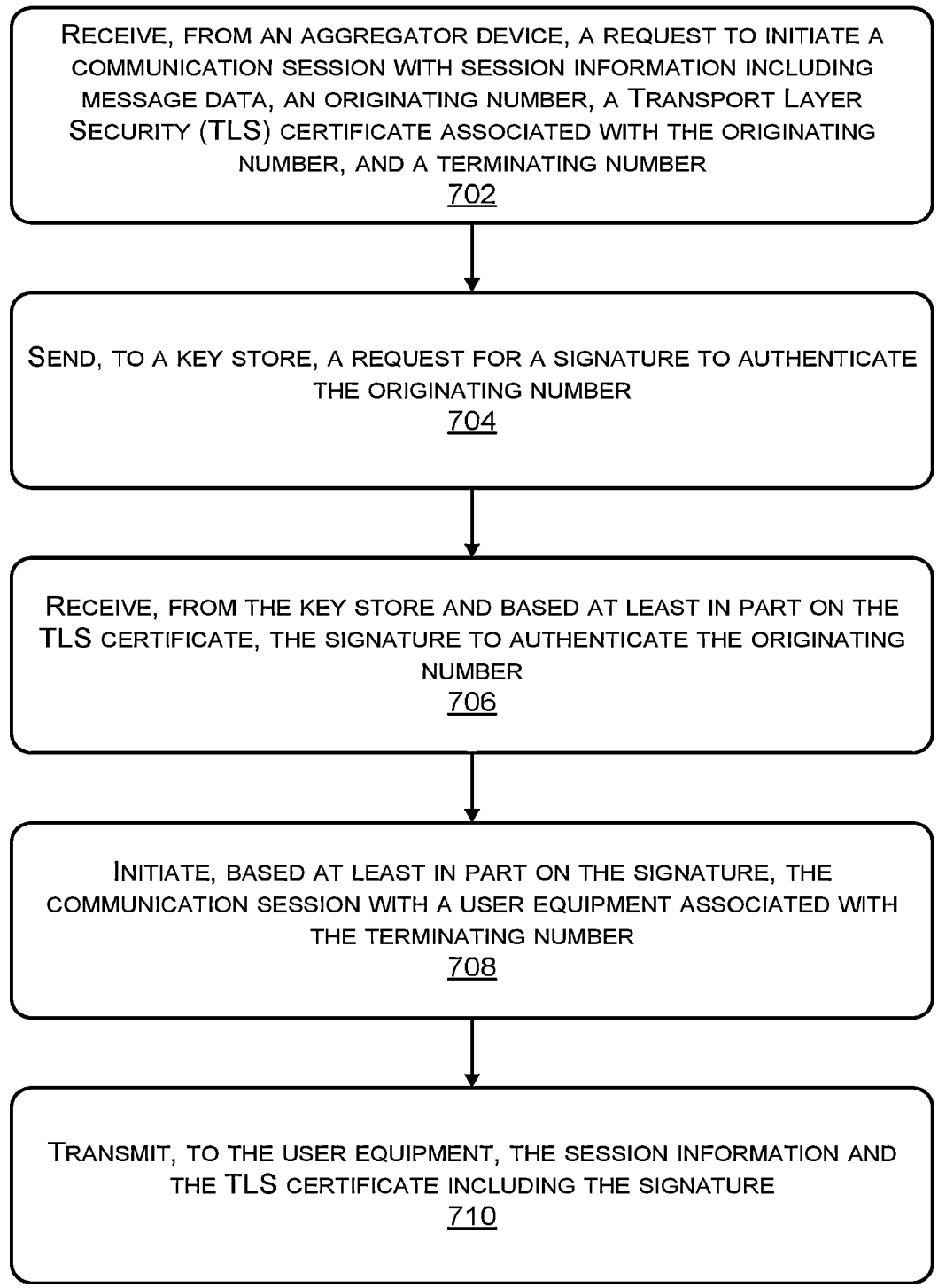
FIG. 7 illustrates an example process for caller verification for a message originating from an aggregator device, as discussed herein.

FIGS. 7 and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 7 illustrates an example process 700 for caller verification for a message originating from an aggregator device, as discussed herein. The example process 700 can be performed by the computing device(s) 108 and/or the network device(s) 112 and 300 (or another component), in connection with the user device(s) 102 and 200 (or another component), and other components discussed herein. Some or all of the process 700 can be performed by one or more devices, equipment, or components illustrated in FIGS. 1-3, for example.

At operation 702, the process can include receiving, from an aggregator device, a request to initiate a communication session with session information including message data, an originating number, a Transport Layer Security (TLS) certificate associated with the originating number, and a terminating number. As discussed herein, the system may receive message data from a message originator and perform caller verification for the message originator. The system can receive RCS messages as a communication session with session information including one or more of message data, an originating number, a Transport Layer Security (TLS) certificate, digital signature, IMDN, a terminating number, and the like.

At operation 704, the process can include a sending, to a key store, a request for a signature to authenticate the originating number. As discussed herein, the system may use public and private keys to verify RCS messages. The system may place the private key in a secure key store (SKS) and place the public key in a certificate repository. In some examples, the system may manage the keys and certificates through a certificate management service (CMS). The CMS can be software run by the service provider or a hosted solution. In some examples, the system may receive an outgoing message via an RCS application from an aggregator and the outgoing message may include a Transport Layer Security (TLS) certificate associated with the entity. The system may send the message to the SKS to request authentication using the TLS certificate and to sign the outgoing message.

At operation 706, the process can include receiving, from the key store and based at least in part on the TLS certificate, the signature to authenticate the originating number. As discussed herein, the system can send the message to the SKS to request authentication using the TLS certificate and receive a digital signature to sign the outgoing message.

At operation 708, the process can include initiating, based at least in part on the signature, the communication session with user equipment associated with the terminating number. As discussed here, the system may receive an incoming message and perform caller identity verification for the originator. The system may send the incoming message to a certificate repository to request verification using the signed incoming message. In some examples, the system may initiate the communication session based on receiving the session information.

At operation 710, the process can include transmitting, to the user equipment, the session information and the TLS certificate including the signature. As discussed herein, the system can transmit the session information and the TLS certificate including the signature.

FIG. 8 illustrates an example process 800 for caller verification for a message originating from a computing device, as discussed herein. The example process 800 can be performed by the network device(s) 112 and 300 (or another component), in connection with the user device(s) 102 and 200 (or another component), and other components discussed herein. Some or all of the process 800 can be performed by one or more devices, equipment, or components illustrated in FIGS. 1-3, for example.

At operation 802, the process can include receiving, from a computing device, a request to initiate a communication session with session information including message data, an originating number, and a terminating number. As discussed herein, the system may receive message data from a message originator and perform caller verification for the message originator. The system can receive RCS messages as a communication session with session information including one or more of message data, an originating number, a Transport Layer Security (TLS) certificate, digital signature, IMDN, a terminating number, and the like.

At operation 804, the process can include determining the session information includes a digital signature associated with the originating number. As discussed herein, the system may determine the session information includes a digital signature associated with the originating number.

At operation 806, the process can include requesting, from a certificate repository, a verification status for the digital signature. As discussed herein, the system may use public and private keys to verify RCS messages. The system may place the private key in a secure key store (SKS) and place the public key in a certificate repository. In some examples, the system may manage the keys and certificates through a certificate management service (CMS). The CMS can be software run by the service provider or a hosted solution.

At operation 808, the process can include receiving, from the certificate repository, the verification status for the digital signature. As discussed here, the system may place the private key in a secure key store (SKS) and place the public key in a certificate repository. In some examples, the system may manage the keys and certificates through a certificate management service (CMS). The system may send the incoming message to a certificate repository to request verification using the signed incoming message.

At operation 810, the process can include generating, based at least in part on the verification status, a status notification. As discussed herein, the system can generate notifications for caller identity verification based on the verification status. The system may display the message with a verification status. In some examples, the system may initiate a communication session for messaging between an originating client and a terminating client, and if the communication session is maintained, the verification status may be maintained until the communication session is terminated. In various examples, the RCS message from an originating client may include an Instant Message Disposition Notification (IMDN) in the message header, and the terminating client may respond to the originator by including IMDN with response messages. The communication session may be terminated based on one or more of: predetermined time out (e.g., 2 seconds after the last message transmitted, 30 minutes after initiate time, etc.), selection of session end by a user, and/or signal loss from a device.

At operation 812, the process can include transmitting, to a user device associated with the terminating number, the session information and the status notification. As discussed herein, the system can transmit the session information and the TLS certificate including the signature.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving, from a user equipment, a request to initiate a Rich Communication Services (RCS) communication session with session information including message data, an originating number associated with the user equipment, and a terminating number;
determining a digital signature associated with the originating number;
requesting, from a certificate repository, a verification status for the digital signature;
receiving, from the certificate repository, the verification status for the digital signature and an entity identifier associated with the user equipment;
determining, based at least in part on the verification status, to transmit the message data to a recipient device associated with the terminating number;
generating, based at least in part on the verification status, a status notification; and
transmitting, to the recipient device and using a Rich Communication Services protocol, the session information and the status notification as part of the Rich Communication Services (RCS) communication session, the status notification including the entity identifier associated with the user equipment.

2. The method of claim 1, wherein the recipient device includes one of a recipient computing device, an aggregator device, or a recipient user equipment.

3. The method of claim 1, further comprising:
receiving, from the recipient device, a response including an Instant Message Disposition Notification (IMDN); and
transmitting, to the user equipment, the response including the IMDN.

4. The method of claim 1, wherein the receiving the request to initiate the RCS communication session further comprises:
receiving, from the user equipment, a subscribe request for a capability set for a communication client associated with the terminating number; and
transmitting, to the recipient device, the subscribe request for the capability set associated with the terminating number.

5. The method of claim 4, further comprising:
receiving, from the recipient device, the capability set; and
transmitting, to the user equipment and based at least in part on the subscribe request, a notify response including the capability set.

6. The method of claim 5, further comprising:
receiving, from the user equipment, the message data for the terminating number, the message data including a multimedia message formatted in accordance to the capability set; and
transmitting, to the recipient device, the message data.

7. The method of claim 1, wherein the status notification indicates an identity of the user equipment.

8. The method of claim 1, wherein the verification status indicates one of a verified status or an unverified status.

9. A system comprising:
one or more processors; and
one or more non-transitory computer-readable media storing instructions that, when executed by the one or more processors, cause the one or more processors to perform operations comprising:
receiving, from a user equipment, a request to initiate a Rich Communication Services (RCS) communication session with session information including message data, an originating number associated with the user equipment, and a terminating number;
determining a digital signature associated with the originating number;
requesting, from a certificate repository, a verification status for the digital signature;
receiving, from the certificate repository, the verification status for the digital signature and an entity identifier associated with the user equipment;
determining, based at least in part on the verification status, to transmit the message data to a recipient device associated with the terminating number;
generating, based at least in part on the verification status, a status notification; and
transmitting, to the recipient device and using a Rich Communication Services protocol, the session information and the status notification as part of the Rich Communication Services (RCS) communication session, the status notification including the entity identifier associated with the user equipment.

10. The system of claim 9, wherein the recipient device includes one of a recipient computing device, an aggregator device, or a recipient user equipment.

11. The system of claim 9, the operations further comprising:
receiving, from the recipient device, a response including an Instant Message Disposition Notification (IMDN); and
transmitting, to the user equipment, the response including the IMDN.

12. The system of claim 9, wherein the receiving the request to initiate the RCS communication session further comprises:
receiving, from the user equipment, a subscribe request for a capability set for a communication client associated with the terminating number; and
transmitting, to the recipient device, the subscribe request for the capability set associated with the terminating number.

13. The system of claim 12, the operations further comprising:
receiving, from the recipient device, a capability set; and
transmitting, to the user equipment and based at least in part on the subscribe request, a notify response including the capability set.

14. The system of claim 13, the operations further comprising:
receiving, from the user equipment, the message data for the terminating number, the message data including a multimedia message formatted in accordance to the capability set; and
transmitting, to the recipient device, the message data.

15. The system of claim 9, the operations further comprising:
terminating the RCS communication session based at least in part on an expiration of a period of time.

16. The system of claim 9, further comprising a message aggregator service, wherein the originating number is a phone number associated with an entity that is a subscriber of the message aggregator service.

17. The system of claim 9, wherein the status notification includes one of: a first status based on the verification status being a verified status and a second status based on the verification status being an unverified status.

18. One or more non transitory computer readable media storing instructions executable by one or more processors, wherein the instructions, when executed, cause the one or more processors to perform operations comprising:
receiving, from a user equipment, a request to initiate a Rich Communication Services (RCS) communication session with session information including message data, an originating number associated with the user equipment, and a terminating number;

determining a digital signature associated with the originating number;

requesting, from a certificate repository, a verification status for the digital signature;

receiving, from the certificate repository, the verification status for the digital signature and an entity identifier associated with the user equipment;

determining, based at least in part on the verification status, to transmit the message data to a recipient device associated with the terminating number;

generating, based at least in part on the verification status, a status notification; and transmitting, to the recipient device and using a Rich Communication Services protocol, the session information and the status notification as part of the Rich Communication Services (RCS) communication session, the status notification including the entity identifier associated with the user equipment.

19. The one or more non transitory computer readable media of claim 18, wherein the recipient device includes one of a recipient computing device, an aggregator device, or a recipient user equipment.

20. The one or more non transitory computer readable media of claim 18, the operations further comprising:

receiving, from the recipient device, a response including an Instant Message Disposition Notification (IMDN); and transmitting, to the user equipment, the response including the IMDN.

\* \* \* \* \*